United States Patent [19]

Walsh

[11] Patent Number: 5,181,816
[45] Date of Patent: Jan. 26, 1993

[54] REMOVABLE ANCHOR TUBE ASSEMBLY

[76] Inventor: James H. Walsh, P.O. Box 924, Longmont, Colo. 80502

[21] Appl. No.: 605,822

[22] Filed: Oct. 26, 1990

[51] Int. Cl.⁵ ............................................. F16B 13/06
[52] U.S. Cl. ........................................ 411/60; 411/45; 411/173
[58] Field of Search .............................. 411/41, 45–48, 411/60, 61, 57, 72, 74, 107, 173, 183, 54

[56] References Cited

U.S. PATENT DOCUMENTS

| | | |
|---|---|---|
| 1,000,715 | 8/1911 | Claywood . |
| 1,379,210 | 5/1921 | Phillips . |
| 1,746,050 | 7/1925 | Phillips . |
| 1,816,970 | 3/1930 | Hess . |
| 1,996,121 | 7/1932 | Phillips . |
| 2,143,917 | 10/1940 | Conner . |
| 2,370,327 | 2/1943 | Rosan . |
| 2,438,533 | 3/1946 | Booth . |
| 2,707,897 | 5/1948 | Beeson . |
| 3,202,035 | 4/1962 | Rosselet . |
| 3,202,692 | 7/1963 | Catlin . |
| 3,606,814 | 2/1969 | MacKenzie . |
| 3,808,938 | 6/1972 | Chromy . |
| 3,965,794 | 6/1976 | Dorgnon ............... 411/54 |
| 4,135,432 | 11/1977 | Schlage . |
| 4,259,890 | 1/1979 | Walsh ................... 411/57 |
| 4,653,132 | 3/1987 | Yamada ................. 411/45 |
| 4,832,547 | 5/1989 | Shiraishi ............... 411/48 |
| 4,840,523 | 6/1989 | Oshida .................. 411/48 |

FOREIGN PATENT DOCUMENTS

| | | | |
|---|---|---|---|
| 216233 | 4/1987 | European Pat. Off. ........... 411/72 |
| 3622937 | 1/1988 | Fed. Rep. of Germany ........ 411/72 |
| 420518 | 2/1911 | France ................... 411/72 |
| 504986 | 4/1920 | France ................... 411/72 |

Primary Examiner—Neill R. Wilson

[57] ABSTRACT

An expanding anchor assembly which after securement can be simply released and immediately easily removed by hand from its embedment matrix substrate without damage to itself, the hole in which it was secured or the matrix substrate in which it was embedded.

The anchor assembly 1 comprises one separate tubular sleeve 2, with a bore through its entire length, and another separate elongated cylindrical plug 3.

Sleeve 2 has one integral securing component 4 end with parallel longitudinal slots 8 forming a plurality of resilient radially expanable tabs 9 with single internal circumferential protrusions 7 located a predetermined distance from their free end. The other integral joining component 5 end has a means of attaching selected separate objects thereto.

Plug 3 is of a length equal to or less than the aforestated protrusion 7's predetermined distance and a diameter movable through bore of sleeve 2.

In function, plug 3, in its movement within bore of sleeve 2 toward securing component 4, results in interference with protrusions 7 expanding tabs 9 radially outward to secure anchor assembly in hole 10 of matrix 11 substrate. The continued movement of plug 3 past protrusions 7 allows tabs 9 to contract radially inward simultaneously entrapping plug 3 and releasing anchor assembly 1 for its subsequent removal.

2 Claims, 1 Drawing Sheet

REMOVABLE ANCHOR TUBE ASSEMBLY

FIELD OF THE INVENTION

The present removable anchor tube assembly pertains to expandable anchor assemblies, particularly to an anchor assembly which, when placed and secured in a formed hole in a matrix substrate, can be released by simple means and then easily removed by hand without damage to itself, the hole in which it was secured or the matrix substrate in which it was embedded.

The securement of objects to matrix substrates by various means, such as by expandable anchor assemblies, is well known and highly practiced by many sectors in today's society.

Anchor assemblies which are misplaced or unwanted present difficulties in their removal and damage to themselves, their securement holes and their embedment matrix substrates. These difficulties can be eliminated through use of the present invention, the removable anchor tube assembly.

DESCRIPTION OF PRIOR ART

What are considered prior art expandable anchor assemblies are represented by United States patents whose serial numbers and respective names of their inventors are as follows:

| | | |
|---|---|---|
| 1,000,715 - Caywood | 2,370,327 - Rosan | 3,202,035 - Rosselet |
| 1,379,210 - Phillips | 2,438,533 - Booth | 3,606,814 - MacKenzie |
| 1,746,050 - Phillips | 2,707,897 - Beeson | 3,808,938 - Chromy |
| 1,816,970 - Hess | 3,143,917 - Conner | 4,135,432 - Schlage |
| 1,996,121 - Phillips | 3,200,692 - Catlin | 4,259,890 - Walsh |

Of all referenced prior art patents, only U.S. Pat. No. 3,606,814-Mackenzie and U.S. Pat. No. 4,259,890-Walsh cite the removal feature. These two patents involve the use of special tools in their difficult and combined anchor release and removal process. The present patent is released in a simple manner, using a hammer and punch, after which it is easily removed solely by hand.

Index to the numerical references of the present invention are inserted herein for convenience of cross reference to the abstract, specification and accompanying drawing sheet 1 of 1. References, which are to be construed both singular and plural in context with like numerals identifying like content throughout the index, are as follows:

1. Anchor Assembly: A complete expandable anchor assembly consisting of one separate sleeve 2 and one plug 3 in projecting stud or recessed insert configurations.
2. Sleeve: A rigid resilient cylindrical tube, which forms one separate part of anchor assembly 1, comprising one integral end securing component 4 and another end joining component 5.
3. Plug: A rigid solid cylinder, which forms the other separate part of anchor assembly 1, for activating the expansion of tabs 9 of securing component 4 of anchor assembly 1.
4. Securing Component 4: One integral end component of sleeve 2 whose function is the securement of anchor assembly 1 in hole 10 within matrix 11 substrate, plus the capture of plug 3 during the release of anchor assembly 1 from securement.
5. Joining Component: The other integral end component whose function is to join a selected separate object to anchor assembly 1 for anchoring to matrix 11 substrate.
6. Identation: That portion of a circumferential depression, of predetermined size, shape and location in and around exterior perimeter of securing component 4, apportioned an integral part of each tab 9 as defined by slots 8.
7. Protrusion: That portion of a circumferential projection, of predetermined size, shape and location on and around the interior perimeter of securing component 4, apportioned an integral part of each tab 9 as defined by slots 8.
8. Slot: A plurality of equal circumferentially spaced longitudinal cuts of predetermined width and length through wall of securing component 4, originating at its free end and extending at least through indentations 6 and protrusions 7, to form a plurality of tab 9.
9. Tab: The longitudinal integral equal wall segments, each with an integral indentation 6 and an integral protrusion 7, of the securing component 4, as formed by a plurality of slot 8.
10. Hole: A circumferential recess, of predetermined shape and size, as formed by a selected method in matrix 11 substrate, for the placement in and securement of anchor assembly 1, in its embedment in matrix 11 substrate.
11. Matrix: The substrate material in which hole 10 is formed to receive and secure anchor assembly 1, in its embedment.

SUMMARY OF THE INVENTION

A few of the objects of the present invention, anchor assembly 1 are as follows:

In design, to offer projecting stud and recessed insert configurations for product marketability, joining component 5 variations to satisfy separate objects attachment requirements plus optional size and location of protrusions 7 to control expansion bearing pressures of tabs 9 within safe physical limits of matrix 11 substrates.

In supply, the use of a variety of common noncritical commercially available materials, such as metals, plastics and composites.

In manufacture, the employment of modern methods, proven processes and tested techniques in cost effective production.

In logistics, the inclusion of plug 3 within sleeve 2 for unity of product to facilitate product shipping, stocking, controlling of inventory and handling in the field.

In installation, adaptability without sacrifice of function, such as placement in either a plastic or rigid state concrete matrix 11 due to the unique method of securement after placement.

In summary, the present invention, anchor assembly 1, has all the design, supply, manufacture, logistics and installation objects aforestated in addition to its primary unique feature of easy removal without damage to itself, the hole 10 in which it was secured or the matrix 11 substrate in which it was embedded.

BRIEF DESCRIPTION OF THE DRAWINGS

A better comprehension of the present invention will be gained by examination of FIGS. 1 through 9 inclusive of accompanying drawing sheet 1 of 1, which are described as follows.

DESCRIPTION OF THE PREFERRED EMBODIMENT

Figure 1:
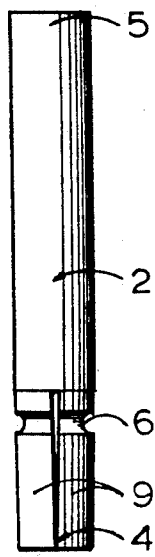
FIG. 1 is a longitudinal side view of sleeve 2 of anchor assembly 1's stud configuration.
Figure 2:
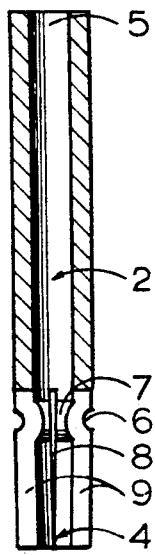
FIG. 2 is a longitudinal sectional view of sleeve 2 of anchor assembly 1's stud configuration.
Figure 3:
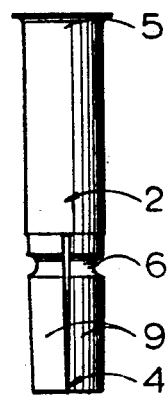
FIG. 3 is a longitudinal side view of sleeve 2 of anchor assembly 1's insert configuration.
Figure 4:
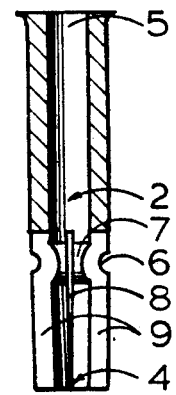
FIG. 4 is a longitudinal sectional view of sleeve 2 anchor assembly 1's insert configuration.
Figure 5:
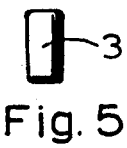
FIG. 5 is a longitudinal side view of plug 3.
Figure 6:
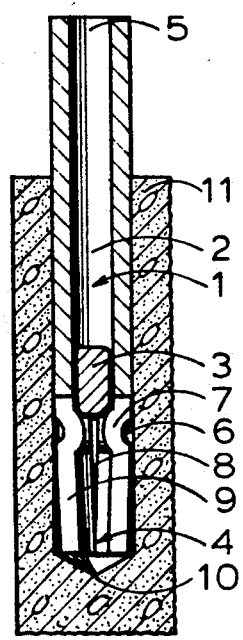
FIG. 6 is a longitudinal sectional view of anchor assembly 1's stud configuration placed in hole 10 of matrix 11 substrate.
Figure 7:
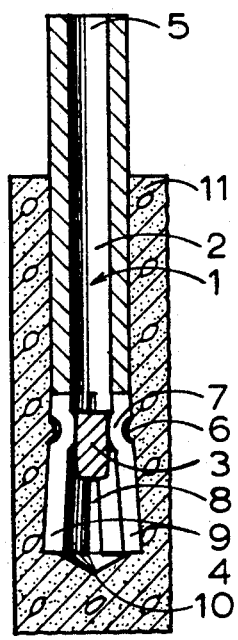
FIG. 7 is a longitudinal sectional view of anchor assembly 1's stud configuration, secured in hole 10 of matrix 11 substrate.
Figure 8:
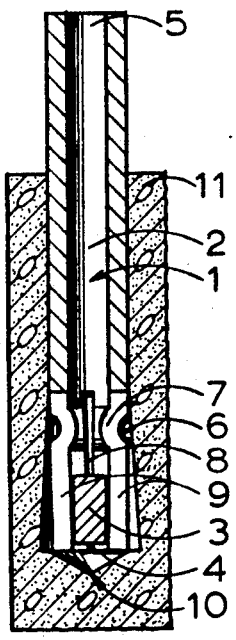
FIG. 8 is a longitudinal sectional view of anchor assembly 1's stud configuration, released in hole 10 of matrix 11 substrate.
Figure 9:
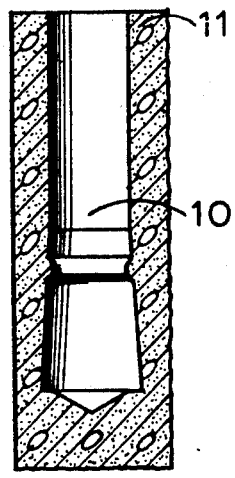
FIG. 9 is a longitudinal sectional view of hole 10 in matrix 11 substrate after removal of anchor assembly 1's stud configuration therefrom.

The preferred embodiment of the present invention anchor assembly 1, of heat treated ferrous alloy metal for induced resilience, in its expanding projecting stud configuration, with exterior threaded joining component 5 and plug 3 preinstalled in bore of sleeve 2, is placed in a drill formed hole 10 of matrix 11 substrate as shown in FIG. 6 of accompanying drawing sheet 1 of 1.

The induced resilience assures the radial inward contraction of tabs 9, with their concurrent capture of plug 3, in the release of anchor assembly 1 from hole 10 in matrix 11 substrate.

The external threading of joining component 5, in connection with use of a nut and washer combination, permits the accurate placement and securement of anchor assembly 1 in an overdepth hole 10 of matrix 11 substrate.

The insertion of plug 3 in bore of sleeve 2 offers many advantages of single product entity for anchor assembly 1.

Finally the anchor assembly 1, in its preferred expanding stud configuration embodiment, is a boon to the installation of large and heavy industrial equipment; wherein the diameter of the anchors match the diameter of the equipment's attachment holes, in the interest of safety, time and costs.

Although particular embodiments of the present invention have been shown and described, along with mention of modifications and alternates, it will be obvious to those knowledgeable and skilled in the art that other changes may be made without departing from the present invention in its broader aspects. Therefore, the aim in the appended claims is to cover all such changes, including modifications, as fall within the true spirit and scope of the present invention.

I claim:

1. An expanding anchor assembly comprising a tubular sleeve having a bore through its entire length and parallel elongated slots at one end forming plural, resilient and radially expandable tabs, wherein each tab includes an internal protrusion spaced a predetermined distance from the tab's free end; and an axially movable, elongated expansion activating plug located in said bore and of a length equal to or less than said predetermined distance and a diameter that allows movement within the bore toward said one end; said movement resulting in interference with the protrusions causing radial outward expansion of the tabs, while continued movement past the protrusions allows the tabs to radially contract inward and frictionally retain the expansion activating plug in the contracted tabs.

2. An expanding anchor assembly as defined in claim 1, wherein the design of the size and location of the tabs internal protrusions can control its securement bearing forces within the safe physical limits of the selected embedment matrix substrate.

* * * * *